United States Patent [19]

Ott et al.

[11] Patent Number: 4,853,970
[45] Date of Patent: Aug. 1, 1989

[54] APPARATUS FOR PROCESSING DIGITIZED IMAGES

[75] Inventors: David M. Ott; Cynthia D. Ott, both of El Cerrito, Calif.

[73] Assignee: Integrated Automation, Berkeley, Calif.

[21] Appl. No.: 129,383

[22] Filed: Nov. 24, 1987

Related U.S. Application Data

[63] Continuation of Ser. No. 592,665, Mar. 24, 1984, abandoned.

[51] Int. Cl.$^4$ .............................................. G06K 9/40
[52] U.S. Cl. ........................................ 382/54; 382/22; 382/27
[58] Field of Search ............... 382/22, 25, 27, 41, 382/54; 358/166, 282

[56] References Cited

U.S. PATENT DOCUMENTS

| | | | |
|---|---|---|---|
| 4,509,195 | 4/1985 | Nadler | 382/41 |
| 4,550,435 | 10/1985 | Hayman | 382/22 |
| 4,554,593 | 11/1985 | Fox et al. | 382/54 |

Primary Examiner—Leo H. Boudreau
Assistant Examiner—Jose L. Couso
Attorney, Agent, or Firm—Townsend and Townsend

[57] ABSTRACT

A method and apparatus for processing a video image so as to feature the boundaries between light and dark regions of the image. The method and apparatus are applicable to a video image which is represented by an array of pixels, in which each pixel is associated with a gray scale intensity value. According to the invention a center pixel is selected along with a plurality of pixels forming a two-dimensional neighborhood of the center pixel. From the intensity values associated with the pixels of the neighborhood, a determination is made whether or not the center pixel lies in a transition region, in which the image undergoes a rapid variation between light and dark. A bit value is then assigned to the center pixel, indicating whether the center pixel is to be black or white in the processed image. The bit value is assigned according to one of two predetermined algorithms depending on whether the center pixel was determined to lie within or not to lie within a transition region. For center pixels lying in a transition region, a first algorithm assigns the bit value with respect to a virtual boundary between light and dark. For center pixels not lying in a transition region, a second algorithm distinct from the first algorithm and presenting no virtual boundary assigns the bit value.

11 Claims, 4 Drawing Sheets

FIG_6.

APPARATUS FOR PROCESSING DIGITIZED IMAGES

BACKGROUND OF THE INVENTION

This is a continuation of Ser. No. 592,665 filed Mar. 24, 1984, now abandoned.

The invention relates generally to the electronic processing of images and is more particularly directed to techniques for enhancing digitized images. The techniques have general applicability to images of printed text and graphic figures, which are printed typically with black ink on a light background, as well as to images of photographs and real-world scenes, which exhibit a continuous variation of tones from light to dark.

Many schemes for the electronic processing of images require that an analog video signal representing the image be converted to a binary digitized video signal. A binary signal is preferable because it lends itself to storage in semiconductor memories for subsequent processing and can be efficiently transmitted to remote users with little degradation. A binary digitized signal representing the image is also desirable in applications producing a hard copy of the image because most printers are inherently binary devices; they either do or do not produce a mark on command at any given position on the paper.

Several different techniques are known for producing a binary digitized image from an analog signal. In digital processing the image is first divided into a two-dimensional array of picture elements, or pixels. In the simplest technique, sometimes referred to as global thresholding, the brightness of the image at each pixel is compared with a predetermined threshold. Those pixels exhibiting a brightness greater than the threshold are represented as white, and those which are less than the threshold are represented as black.

Global thresholding is undesirable, in part, because the predetermined threshold does not take into account differences in overall brightness due to lighting or due to the shade of the paper carrying the image to be sensed. In an improved technique, sometimes known as adaptive thresholding, the threshold level delineating the demarcation between black and white is continually updated. For example, it may be set at a fixed percentage of the average brightness or of the peak brightness of a document page and updated on a page by page basis. Alternatively, the threshold is sometimes continuously updated by tracking changes in average brightness over a limited region of the image and updating the threshold as the image is scanned. Both one-dimensional and two-dimensional tracking regions have been used in the past. In the one-dimensional case the brightness of a pixel is compared with the brightness of other pixels in the same scan line. In the two-dimensional case the brightness of a pixel is compared with that of pixels not only in the same scan line but also in other scan lines.

The methods just described are most commonly applied to images of printed documents containing textual material and graphical material such as line drawings, charts, or graphs. Even when applied to such documents, each of the above-described methods represents a tradeoff between such factors as image resolution, processing time, memory space dedicated to the image data during processing, and the ability to compensate for local variations in image quality due, for example, to nonuniform illumination or paper discoloration.

The above methods do not work especially well with photographs or real-world scenes because these images are not strictly black and white; instead, they include intermediate shades of gray varying continuously from black to white. One method of digitizing continuous gray scale images borrows from the half-tone techniques used in the printing art to reproduce continuous gray scale photographs on a printed page. In the digital half-toning technique a video signal representing the continuous-tone image is electronically combined with a periodic signal representing a half-tone grid. The result is a periodic signal in which the original continuous-tone image has been divided into an array of cells, which are analogous to the half-tone dots familiar from conventional printing. Each of these cells typically comprises a subarray of pixels. Various methods are used to decide which of the pixels within any one cell will be black and which will be white. The cell size and pixel size are typically such that from a distance the human eye will integrate the pixels and perceive only a cell having a shade of gray.

The various methods for deciding which pixels of a cell are to be black in the output image and which are to be white differ from one another primarily by the placement of the black pixels within the cell. In the digital half-toning process the subarray of pixels forming a cell are assigned threshold levels between white and black which are arranged so that numerically similar thresholds are spatially adjacent to one another. This technique tends to produce a blotchy image, especially when used to reproduce black and white textual materials in addition to gray scale images. In the ordered dither approach numerically similar thresholds are spatially separated from one another within each cell by a pixel having a significantly higher or lower threshold. This arrangement reduces the blotchiness of the output image, but tends to produce many isolated black pixels, which distort the simulated gray levels in the output image. The many isolated black pixels also prevent efficient data compression.

Yet another approach to the assignment of black and white pixels within a cell is the sorted pseudo-gray technique. In this approach the total number of black pixels assigned to a cell is chosen in proportion to the average input gray level of the cell. The input pixels in the cell are sorted by position and gray level, and the output black pixels are assigned to the positions of the darkest input pixels. For continuous-tone pictorial images the sorted pseudo-gray approach produces an output image exhibiting better contrast than either of the above-described approaches. In regions of slowly changing gray level, however, the black pixels tend to accumulate at one side of the cells, making the pattern of cells apparent and giving the image a distracting mottled background.

The electronic half-tone techniques differ from one another in the general quality with which they reconstruct images, in their ability to resolve fine details of continuous-tone images, and in the efficiency with which the data encoding the half-tone dot structures can be compressed. The known half-tone techniques represent a tradeoff of these factors. When applied to textual material or strictly black and white graphics, the half-tone techniques produce an unsatisfactory, speckled image. Thresholding techniques, on the other hand, can produce satisfactory representations of textual material and graphics, but produce poor quality representations of continuous gray-scale images. In the scanning of documents including both text and gray scale pictures, at present one must either compromise the quality of the continuous-tone pictures or of the black and white text, or a human operator must be interposed to handle the text and pictures separately.

In addition to the tradeoffs indicated above, the known binary digitizing techniques are deficient in regard to processing speed. Real-time imaging applications call for the processing of images at high speed. For example, images of documents such as checks or bank drafts may be captured "on the fly" from a document transport moving as fast as several hundred inches per second and processed in-line for storage and later display. Or the images of electronic components on an automated assembly line may be captured for in-line monitoring and quality control. Such applications put severe restrictions on the time available for image manipulation and processing. In the past it has been necessary to sacrifice the quality of image reconstruction for the sake of processing speed or, alternatively, to forego in-line processing altogether and manipulate the image data in non-real time according to more complicated, but sower enhancement algorithms implemented by a general purpose computer.

SUMMARY OF THE INVENTION

The present invention provides a method and apparatus for processing digitized images which can be applied equally well to representations of textual material in black and white and to pictures or real-world scenes exhibiting continuously varying tones of gray or other color. When applied to continuous-tone pictures, the invention produces a reconstructed image showing greater clarity of detail than any of the known half-tone techniques would produce without the benefit of the invention.

Briefly, the invention provides a method of processing a video image represented by an array of pixels so as to feature the boundaries between light and dark regions of the image. The method is applicable to arrays in which an intensity value is associated with each pixel. The intensity value will typically be indicative of gray level, but could also be indicative of the hue or saturation level of a colored image. In a raw image as captured by a video camera, for example, a light and a dark region will ordinarily be separated by a transition region, in which the image undergoes a rapid variation between light and dark.

According to the invention the raw video image is enhanced by selecting a first pixel of the array (referred to as the "center" pixel) and selecting a plurality of pixels forming a two-dimensional neighborhood of the center pixel. From the intensity values associated with the pixels of the neighborhood, a determination is made whether or not the center pixel lies in a transition region. For example, the determination may be made by providing a measure of the variation of intensity values within the neighborhood and then comparing that measure with a threshold. If the measure of intensity variation is greater than the threshold, then the center pixel is deemed to lie in a transition region. A bit value is then assigned to the center pixel, indicating whether the center pixel is to be black or white in the reconstructed image. The bit value is assigned according to one of two predetermined algorithms depending on whether the center pixel was determined to lie within or not to lie within a transition region. For center pixels lying in a transition region, a first algorithm assigns the bit value with respect to a virtual boundary between light and dark; that is, the bit value indicates to which side of a virtual boundary the center pixel lies. For center pixels not lying in a transition region, a second algorithm distinct from the first algorithm and presenting no virtual boundary assigns the bit value. For example, the second algorithm may be any of the known half-tone or thresholding algorithms.

One of the striking features of the invention is that even when the method is applied only to a continuous-tone picture and the second algorithm is a sophisticated half-tone algorithm known to give high quality reconstruction of continuous-tone images, the method will nevertheless yield a reconstructed image of enhanced quality. The method escapes from the sophisticated half-tone algorithm near the edges of shadows or other regions of high contrast and substitutes a different algorithm better adapted for defining the edge of the shadow or high-contrast region. The result is a reconstructed image which is clearer and more recognizable than the image reconstructed by the sophisticated half-tone algorithm alone. Another surprising advantage of enhanced image reconstruction by the present method is that the image data, that is, the bit values produced by the present method, may be much more efficiently compressed by the commonly used data-compression schemes than the image data determined by the second algorithm alone.

Apparatus according to the invention comprises a first means which receives the array of pixels representing the video image and which presents from the array a center pixel along with a two-dimensional neighborhood of the center pixel. An edge operator module receives the center pixel and its two-dimensional neighborhood and determines whether the center pixel lies in a transition region. The edge operator provides a bit value (referred to herein as the edge bit value) which indicates the disposition of the center pixel with respect to the transition region of the image; that is, the edge bit value indicates whether the center pixel does or does not lie within a transition region. A point operator module receives the center pixel along with its neighborhood and assigns a bit value (referred to herein as the point bit value) to the center pixel indicating whether the center pixel is to be light or dark in the reconstructed image. The point bit value is assigned on the basis of the intensity values of the pixels within the two-dimensional neighborhood of the center pixel. A level operator module receives the center pixel and assigns another bit value (referred to herein as the level bit value) to the center pixel indicating whether it is to be dark or light in the reconstructed image. The level bit value is assigned on the basis of a comparison of the center pixel intensity value with a prescribed level threshold, for example, a level threshold defined by a prescribed thresholding or half-tone algorithm. A logic means receives the edge bit value, the point bit value, and the level bit value and passes the point bit value to an output whenever the edge bit value indicates that the center pixel lies in a transition region. When the edge bit value indicates otherwise, the logic means passes the level bit value to the output.

A further understanding and appreciation of the nature and advantages of the invention will be gained by reference to the remaining portion of the specification and to the attached drawings.

DETAILED DESCRIPTION OF THE PREFERRED EMBODIMENT

Figure 1:
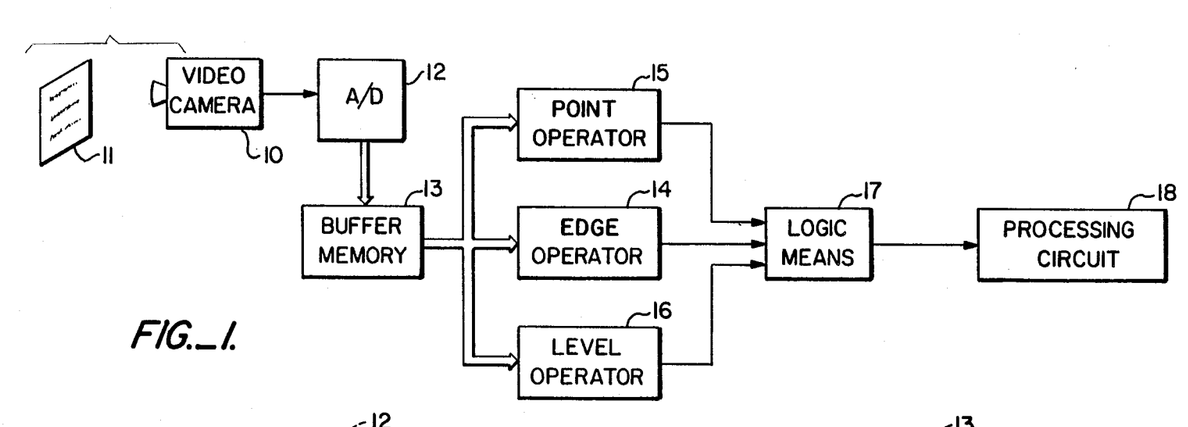
FIG. 1 is a block diagram of a digitized image processing system according to the invention.

FIG. 1 provides an overall view of an imaging system incorporating the present invention. The system includes a video camera 10 for capturing an image. For purposes of illustration video camera 10 is shown capturing the image of a document 11, such as a page of printed text, a photograph, or a document including both text and printed or otherwise reproduced photographs. The camera can just as well capture a real-world image, for example, the image of electronic components or printed circuit boards along an assembly line as part of a quality-control inspection system. Video camera 10 provides an analog video signal which is representative of the image captured. Suitable video cameras for use with the present invention are well known and are commercially available. The particular video camera is not part of the present invention and will not be described further.

The preferred embodiment of the invention is implemented with digital technology. The analog signal from video camera 10 is converted to a digital signal by analog-to-digital (A/D) converter 12. The output signal from A/D converter 12 represents an array of pixels capturing the image of the document or real-world scene scanned.

With each pixel is associated an intensity value. For example, when video camera 10 provides a black and white representation of the image scanned, the intensity value represents a gray level. When the camera provides a representation of the image in color, the intensity value may represent the hue or saturation of a primary color associated with the pixel. In the specific embodiment described herein A/D converter 12 provides an 8-bit digital signal representing an 8-bit gray scale associated with each pixel.

The 8-bit digital video signal of A/D converter 12 is stored in line-scan buffer memory 13, which is configured to present each pixel along with a neighborhood thereof to the subsequent processing modules, which are referred to herein as edge operator module 14, point operator module 15, and level operator module 16. In particular, buffer memory 13 operates to present three scan lines simultaneously to the subsequent operator modules. From the three scan lines presented the operator modules select a center pixel (which is selected from the center scan line) and an array of pixels (which is selected from all three scan lines) surrounding the center pixel. Although referred to herein as the "center" pixel, the pixel may not in fact always be symmetrically disposed in the center of the selected neighborhood; for example, at the perimeter of the scanned image the "center" pixel may lie at the edge of the selected neighborhood.

Edge operator module 14 receives the intensity values associated with the center pixel and its neighborhood and determines from those intensity values whether the center pixel lies in a transition region; that is, edge operator module 14 determines whether the center pixel lies near a boundary between a light region and a dark region of the scanned image. The edge operator makes this determination by computing a measure of the variation of intensity values across the neighborhood of the center pixel and comparing the computed measure with a prescribed threshold. If the pixel intensity variation in the neighborhood is greater than the threshold, the edge operator module provides a signal indicating that the center pixel is in a transition region. A more detailed description of the edge operator module is given below.

One feature of the present invention is the fact that two separate procedures are followed to assign a bit value to the center pixel depending upon whether the center pixel is or is not near an edge. Point operator module 15 assigns a bit value to the center pixel according to a first algorithm, referred to herein as the point algorithm, which includes an implicit definition of a virtual boundary between the light and dark regions on either side of the transition region. The point algorithm comprises a computational and logical procedure for determining on which side of the virtual boundary the center pixel lies. Level operator module 16, on the other hand, assigns a bit value to the center pixel according to a second algorithm, referred to herein as the level algorithm, which assumes that no edges are close to the center pixel. The level algorithm comprises a computational and logical procedure for assigning the pixel bit value based on the assumption that the intensity values in a neighborhood of the center pixel undergo at most only a gradual variation. For example, the level algorithm may include a digital half-tone algorithm for reproducing gradual variations in gray level. The point and level operator modules are described in more detail below, and several examples of level algorithms are given.

The point operator module 15 provides a so called binary point video signal; the level operator module 16 provides a so-called binary level video signal; and the edge operator module 14 provides a so-called binary edge signal. These signals are applied to logic module 17. Based on the binary edge signal, which carries the edge bit values, the logic module 17 selectively passes either the binary point video signal or the binary level video signal on to the subsequent processing circuit 18.

Processing circuit 18 may comprise appropriate circuitry for storing, displaying, or printing the image scanned. It may also comprise data-compression and communication circuitry for transmitting the information to a remote location. The precise nature of processing circuit 18 is not a part of the present invention and will not be described further.

Figure 2A:
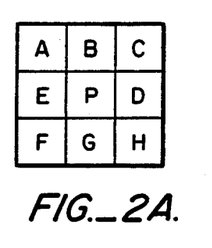
FIG. 2A is a graphical representation of a dense of pixels about the center pixel P.
Figure 2B:
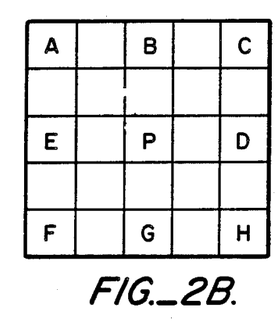
FIG. 2B is a graphical representation of a sparse neighborhood of pixels about the center pixel P.

The nature of the neighborhood which is selected to be applied to the operator modules 14–16 plays a role in the quality of the image enhancement produced by the invention. Two types of neighborhoods have been found to produce quality enhancement with efficient operation. These neighborhoods are referred to as dense and sparse. A dense neighborhood comprises the pixels bounding directly on the center pixel. For a rectangular array of pixels representing the image, the dense neighborhood consists of the eight pixels immediately surrounding the center pixel. The dense neighborhood, sometimes referred to as a 3×3 neighborhood, is illustrated in FIG. 2A. The center pixel is labeled P and the pixels forming the 3×3 neighborhood are labeled by the letters A-H. A sparse neighborhood, on the other hand, comprises a selected plurality of pixels which surround the center pixel, but which do not directly bound on the center pixel. That is, in a sparse neighborhood other pixels not belonging to the neighborhood are interposed between the center pixel and those comprising the neighborhood. An illustration of a 5×5 sparse neighborhood is shown in FIG. 2B. As in FIG. 2A, the center pixel is labeled P, and the neighborhood pixels are labeled A-H.

It has been found advantageous to select the pixels of a neighborhood so as to form a square about the center pixel. If the line scan axis and the pixel axis have different resolutions, the line spacing should be selected with a delay different from that of the point spacing so that the selected neighborhood will be square.

The best neighborhood to select in a given application depends upon the blur characteristics of the image and the minimum size of the image features. For efficient processing and good resolution the selected neighborhood should span a distance at least as great as the narrowest dimension of a transition region in the image. Thus, the lower acceptable limit of the neighborhood size depends upon the amount of expected blur in the image. For example, an image with one or two pixels per transition region can be decoded and enhanced by the present method with either a 3×3 or 5×5 neighborhood. If a typical transition region is 3 or 4 pixels wide, then a 5×5 neighborhood is the smallest which should be selected.

The maximum acceptable dimension of the selected neighborhood depends on the minimum feature size which is to be detected. If the image features can be less than 2 pixels wide or less than 2 pixels apart, then a 3×3 neighborhood is the largest which should be used. For features which are at least two pixels wide, a 5×5 neighborhood would be adequate. Aliasing errors can be introduced into the processed image if neighborhoods are used which are too large.

In addition to aliasing and resolution, there are other practical considerations which affect the selection of neighborhood size. A video camera employing a high-resolution linear CCD array will typically produce an output signal exhibiting a square wave superimposed on the output signal of interest. In a CCD array alternating pixels pass through different amplifying paths. The square wave modulation results from imperfections in the adjustments for equalizing the alternate path gains. If a 5×5 or 9×9 sparse neighborhood is used, all pixels entering into an individual computation will have passed through the same path, thereby avoiding decoding errors stemming from the square wave modulation. If a 3×3 or 7×7 neighborhood is used, the pixels will be subject to such errors. If a vidicon-type camera producing two interleaved fields is used, adjacent scan lines will invariably exhibit offset and gain differences. A 3×3 or 7×7 neighborhood will be sensitive to these differences, whereas a 5×5 or 9×9 neighborhood will not. If the 5×5 or 9×9 neighborhood is selected, the scan lines can be processed "in line," rather than having to store scan line data from the first field until the second field is received.

Having given a broad view of an imaging system incorporating the invention, an overview is now presented of the algorithms applied by operator modules 14-16. These algorithms call for arithmetic and logical operations to be performed on the intensity values associated with the center pixel and with the pixels of the selected neighborhood. In the discussion below the respective intensity values are indicated by the same letters designating the pixels of FIGS. 2A and 2B. That is, the symbol A represents the intensity value associated with pixel A, and so forth.

As described above, the edge operator determines whether a given center pixel lies in a transition region by first providing a measure of the variation of intensity values across a selected neighborhood of the center pixel and then comparing that measure with an appropriate threshold. As a simple example, a measure of the variation of intensity values (referred to herein as the edge measure EM) may be computed according to the following equation:

$$EM = (1/8) \sum_{X=A}^{H} |X - P| \qquad \text{(Eq. 1)}$$

According to Equation 1 the difference is calculated between the intensity value of the center pixel and the intensity values of the other pixels of the neighborhood, and then the magnitudes of those differences are averaged.

The measure EM according to Equation 1 is especially desirable because it is homogeneous in the sense that it gives no preference to a variation of intensity values in any particular direction across the neighborhood. Homogeneity in this sense is a desirable characteristic because it enables the edge operator to detect a transition region no matter in which direction the associated edge may run. Image-processing schemes are known for the imaging and processing of printed or type textual matter which search for the edges of the of letters of the text. Such schemes generally employ a one-dimensional edge-detection algorithm. A one-dimensional algorithm, however, gives preference to edges which run substantially perpendicular to the dimension defined by the algorithm. Such a preference is acceptable in the processing of textual matter because it is known beforehand that most edges will run perpendicular to the scan direction. The one-dimensional schemes do not produce satisfactory results when applied to graphics having lines running in arbitrary directions or to photographs and pictures which generally include shadow regions having boundaries running in arbitrary curvilinear directions. The use of a two-dimensional neighborhood with a homogeneous measure of intensity variation enables the present scheme to be applied with highly satisfactory results to text, graphics, and continuous-tone pictures or real-world scenes.

The edge operator module 14 compares the measure EM with an edge threshold value. The edge threshold may be defined by any of the well known thresholding techniques. For example the threshold may be provided by a fixed, predetermined value. Such a system is simple to implement, but as is well known leads to varying results depending upon such factors as differences in overall illumination, the presence of shadows, shade of paper, and local discolorations of the paper. Much more desirable is a relative thresholding technique in which the edge threshold depends upon a representative intensity value of the pixels making up a complete frame of the scanned image. For example, the threshold may be set after scanning the first few lines of the frame, which in the case of a document usually correspond to the background level of the document.

In a simple example of a point algorithm applied by point operator module 15, a point measure (PM) is calculated according to the following equation:

$$PM = \left[ (1/8) \sum_{X=A}^{H} X \right] - P \qquad \text{(Eq. 2)}$$

The quantity in the brackets of Equation 2 represents an average intensity value for the selected neighborhood, and the quantity PM is an intermediate value measuring the difference between the intensity value of the center pixel and the average intensity of the associated neighborhood. In this simple example of a point algorithm, a bit value is assigned to the center pixel indicating whether the point measure PM is greater than or less than zero. The bit value so assigned thus indicates whether the intensity value of the center pixel is greater than or less than the average intensity of the surrounding neighborhood.

Figure 3:
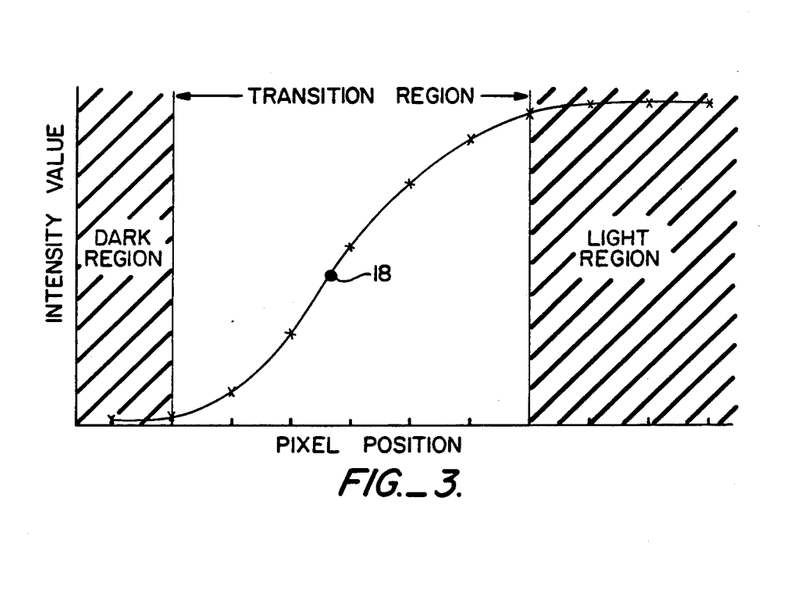
FIG. 3 is a graph illustrating the definition of the virtual boundary in the example of a one-dimensional neighborhood.

This algorithm is especially desirable in that the resulting bit value assignment is essentially independent of the overall brightness of the region being scanned, the contrast of the transition region, and the amount of blur in the transition region. The reason for this may be appreciated by considering a one-dimensional analog of the above-described point algorithm. FIG. 3 is a graph showing the typical variation in gray level of an image at an edge between a light region and a dark region as the image is scanned along a dimension perpendicular to the edge. The pixels in the scanned image have intensity values represented by the process along the curve in FIG. 3. In the one-dimensional analog of the above algorithm the intensity value of the center pixel is compared with the average of the neighbors on either side of the center pixel. When the center pixel in question lies to the left of the point of inflection 18 of the intensity curve, the average so computed will be greater than the center pixel intensity. When the center pixel lies to the right of point of inflection 18, the average so computed will be less than the center pixel intensity. Thus, the bit value assigned according to the above point algorithm indicates whether the center pixel lies to one side or the other of the point of inflection of the intensity curve. In effect, the above point algorithm defines the point of inflection as the location of a virtual boundary between light and dark regions in the enhanced image. The point of inflection provides a particularly desirable definition of the virtual boundary because it is comparatively stable as the overall brightness, contrast, and width of the transition region are varied. To first order the point of inflection remains fixed as the intensity curve is perturbed. The point algorithm based on Equation 2 defines implicitly a virtual boundary analogous to the point of inflection of this one-dimensional example.

The level operator module 16 may make advantageous use of any of the known algorithms for assigning bit values to the pixels of a scanned image. If the scanned image is known to consist initially of only black and white regions, a simple level algorithm may be used which compares the intensity value of the center pixel with a predetermined, fixed or relative threshold. Even in this case, where shades of intermediate gray are known to be absent, the combination of point, edge, and level algorithms of the present invention provides a greatly improved representation of images imprinted on a dark background, for example, printing on a dark sheet of paper. In this case the present invention produces a halo image, that is, an image in which black characters or features are outlined with a white halo against a black background. For original images in which the perception of gray levels is to be preserved, it is desirable to employ a gray level algorithm, such as a digital half-tone algorithm, which reproduces the dot structure so familiar from the printing industry. Even when a known gray level algorithm is applied by level operator module 16, however, the resulting image is greatly enhanced over that which would be produced by the same gray level algorithm operating without the benefit of the present invention. This enhancement can be used to allow selection of a gray level algorithm optimized for purposes such as flicker reduction on CRT displays or good data compression, rather than being optimized for fine feature detection. When a known gray level algorithm is applied in combination with the other algorithms as taught by the present invention, the image-processing apparatus will be caused to escape from the gray level algorithm whenever a transition region is detected. This escape will occur even in the interior regions of a continuous-tone photograph where known digital half-tone algorithms are expected to give good image reproduction. The demarcation lines between light and dark regions, for example, edges of shadows or folds in clothing, will be defined in the present invention by the point algorithm and not by the gray level algorithm.

Another surprising feature of the invention is that it enables known gray-level algorithms to be satisfactorily applied to purely black and white text. Although gray-level algorithms are generally believed to give inferior results when applied to text, when supplemented with the edge and point operations as taught by the present invention, they are found to yield quite acceptable reconstruction of the images of printed letters. For example, for typewritten characters having a typical line width of only a fraction of a millimeter, the image is reconstructed by the point algorithm. For boldface type having a typical line width equal to a millimeter or more, the edges of the characters are reconstructed according to the point algorithm and only the interior region of the character line, which is generally solid black, is filled in by the gray-level algorithm.

Figure 4:
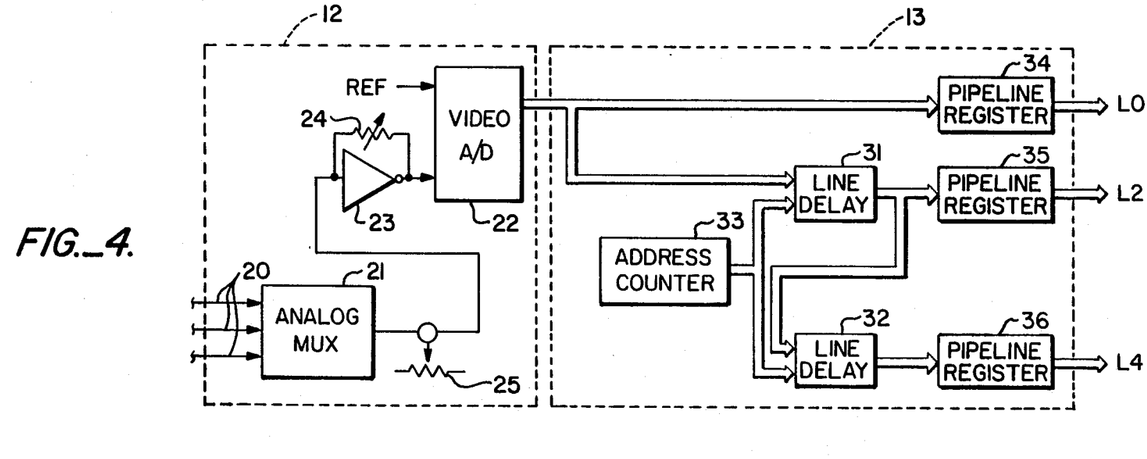
FIG. 4 is a block diagram of the A/D converter and buffer memory illustrated in FIG. 1.

A detailed description of a preferred embodiment of an image digitizing and processing system according to the invention will now be described with reference to FIGS. 4–6. A/D converter 12 can receive up to three analog video signals. As illustrated in FIG. 4, these signals are applied to inputs 20 of analog multiplexer 21, which provides a multiplexed analog video signal. The multiplexing capability is desirable, for example, when a color video camera is used. In that case the three analog signals represent the three primary color signals. If three input signals are present, they are preferably multiplexed in the analog domain at a rate slower than the pixel rate of the video camera. For example, they may be multiplexed at the line scan or frame rate. The analog video signal from video camera 10, or the multiplexed signal from analog multiplexer 21, is applied to monolithic video A/D converter 22, which may be provided by TRW part No. TDC-1007. The analog video signal is applied to the input of video A/D converter chip 22 through drive amplifier 23. Gain and offset controls are represented symbolically by potentiometers 24 and 25, respectively. The TDC-1007 monolithic A/D converter receives an input reference signal along with the analog video signal. For proper operation of the TDC-1007 the input video signal should not exceed a prescribed maximum reference signal. Clamping diodes may also be provided to hold the video analog input signal to the acceptable range. The TDC-1007 provides an 8-bit digital output signal, which represents an array of pixels and associated intensity values for the scanned image.

Line scan buffer memory 13 comprises first and second scan line delay means 31 and 32. These may be provided, for example, by an integrated circuit memory such as Integrated Device Technology part No. 6116. Each delay means 31 and 32 delays the incoming signal for an entire scan line. Address counter 33 is initialized by an appropriate timing signal at the beginning of each scan line. Counter 33 counts through the number of pixels scanned before the second line of the selected neighborhood. For example, for a 3×3 neighborhood and a video camera providing 2048 pixels, per scan line counter 33 counts to 2048. For a 5×5 neighborhood and the same video camera, counter 33 counts to 4096. Counter 33 then causes memory 31 to be read and a signal is provided representing the center line of the selected neighborhood. Simultaneously, the contents of memory device 31 are written into memory device 32 while the next line is written into memory device 31. Three successive scan lines are presented simultaneously at the outputs of pipeline registers 34–36 at buses L0, L2, and L4. The buses are so labeled in FIG. 4 because the most commonly selected neighborhood in practice is found to be the sparse 5×5 neighborhood, and this neighborhood is composed of pixels from the zeroth, second, and fourth successive scan lines.

Figure 5:
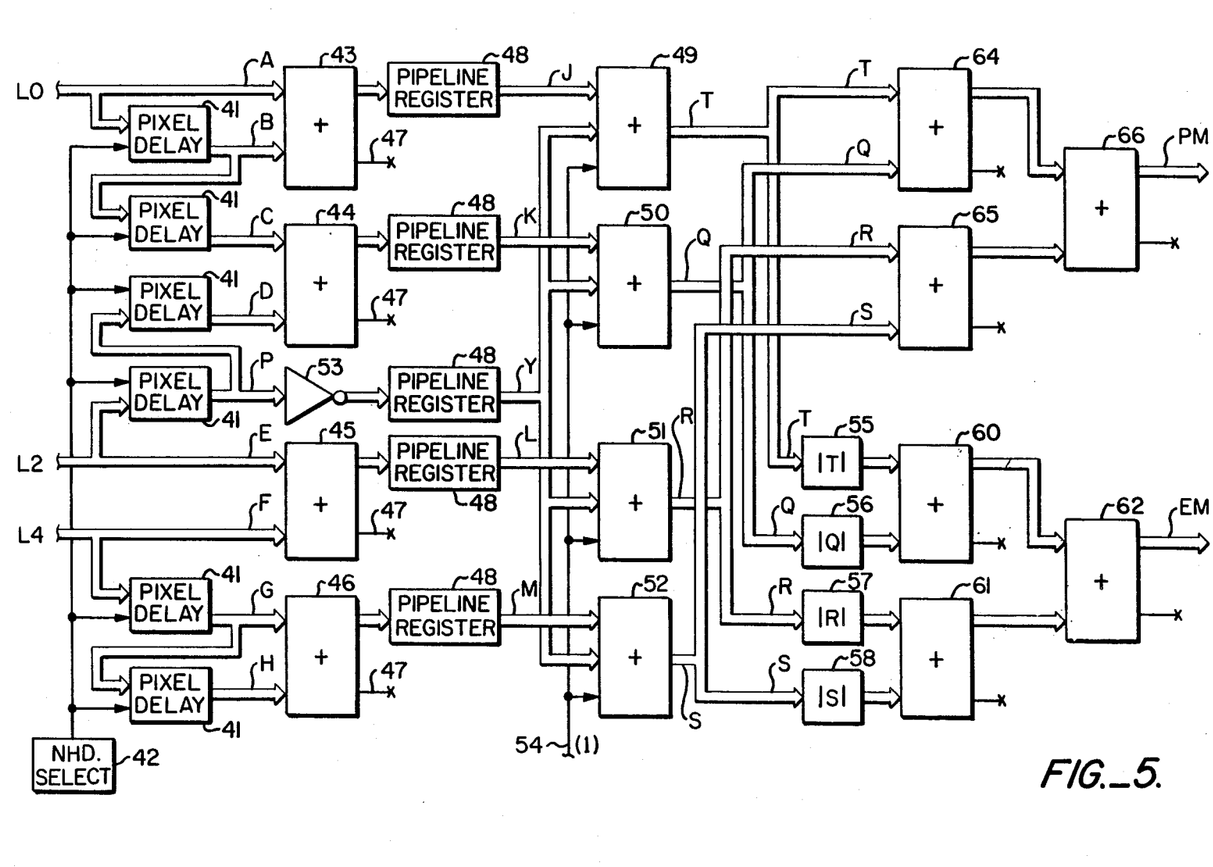
FIG. 5 is a block diagram of a portion of the edge and point operator modules illustrated in FIG. 1.

The data streams from line scan buses L0, L2, and L4 are applied to pixel delay means 41 shown in FIG. 5. Each of the delay means 41 is 8 bits wide, so as to accommodate 8 bits of gray scale, and can delay the data stream by a jumperable amount from one to four pixels. In a 3×3 neighborhood adjacent pixels in the same scan line are separated by a one-pixel delay. In a 9×9 neighborhood the adjacent pixels of the neighborhood in the same scan line are separated by a four-pixel delay. Jumper 42 is used to set the amount of the delay simultaneously on all of the pixel delay means 41 and, thus, serves as a neighborhood select means. Delay means 41 may be provided by multilevel pipeline delay registers such as Advanced Micro Devices part number 29520.

The scan line data buses L0, L2, and L4 and the delayed scan line data buses from pixel delay means 41 communicate the intensity values of the neighborhood pixels A–H and of the center pixel P simultaneously to the subsequent operator module circuitry. The buses are labeled b the letters A–H and P in FIG. 5 corresponding to the pixels which they carry.

In the preferred embodiment of the invention point and edge algorithms are used which depart somewhat from those of Equations 1 and 2. The preferred algorithms allow a considerable savings of hardware, enabling the apparatus to be fabricated more economically and providing a considerable increase in processing speed. In the preferred embodiment portions of the point and edge algorithms are implemented by common hardware. The common hardware computes certain intermediate values, which are later used in further computations performed by distinct hardware to complete the point and edge algorithms.

For reasons discussed hereinbelow the preferred hardware implementation includes multiple levels of pipeline delays. FIGS. 5 and 6 show such an implementation, which, for the sake of clarity of exposition, includes only one level of pipeline delay. The algorithms implemented in FIGS. 5 and 6 are based on Equations 3 and 4 below. Further pipeline delays would unnecessarily complicate these equations and only obscure the exposition of the preferred point and edge algorithms. Given the explanations provided here, those skilled in the art will readily be able to introduce further pipeline delays and adapt the point and edge algorithms accordingly.

Figure 6:
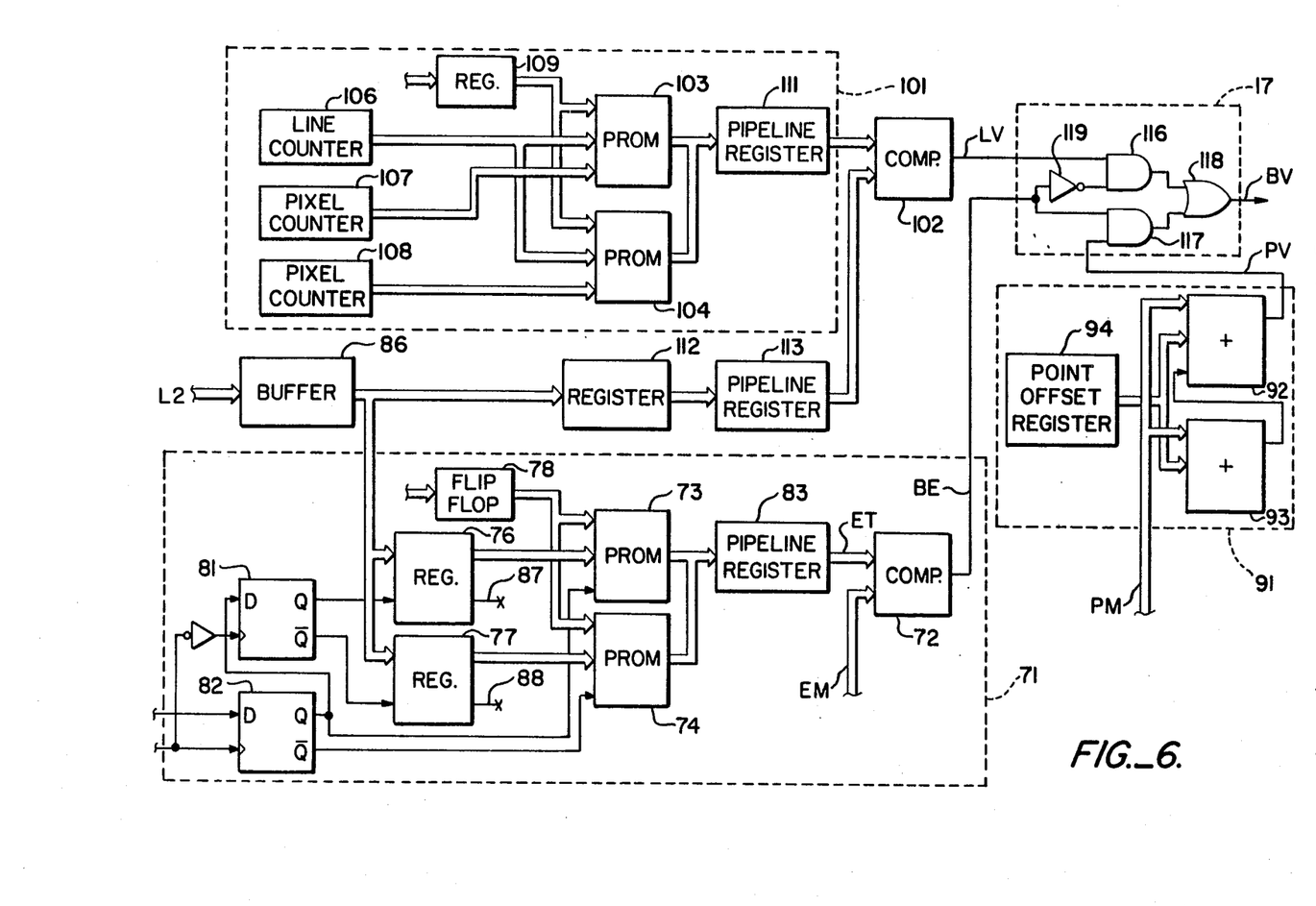
FIG. 6 is a continuation of the block diagram of FIG. 5 showing the level operator module illustrated in FIG. 1, the remaining portions of the edge and point operator modules, and the logic means of FIG. 1.

The algorithms implemented in FIGS. 5 and 6 are based on the following equations, in which both the arithmetic manipulations of intensity values and relative clock cycles are indicated:

$$\begin{aligned}
PM &= [(T/2 + Q/2)/2 + (R/2 + S/2)/2]/2 \\
&= [T + Q + R + S]/8 \\
&= [(J - Z) + (K - Z) + (L - Z) + (M - Z)]/8 \\
&= [(A + B)/2 + (C + D)/2 + (E + F)/2 + (G + H)/2 - 4P]/8 \\
&\quad \text{(with a one-clock-cycle delay)} \\
&= [(A + B + C + D + E + F + G + H)/8 - P]/2, \\
&\quad \text{(with a one-clock-cycle delay)}
\end{aligned}$$
(Eq. 3)

$$\begin{aligned}
EM &= [(|T| + |Q|)/2 + (|R| + |S|)/2]/2 \\
&= [(|T| + |Q| + |R| + |S|]/4 \\
&= [|J - Z| + |K - Z| + |L - Z| + |M - Z|]/4 \\
&= [|(A + B)/2 - P| + |(C + D)/2 - P| + |(E + F)/2 - P| + |(G + H)/2 - P|]/8 \\
&\quad \text{(with a one-clock-cycle delay)} \\
&= [|(A - P) + (B - P)| + |(C - P) + (D - P)| + |(E - P) + (F - P)| + |(G - P) + (H - P)|]/8, \\
&\quad \text{(with a one-clock-cycle delay)}
\end{aligned}$$
(Eq. 4)

where the intermediate quantities J, K, L, M, Q, R, S, and T are identified as follows:

J=(A+B)/2, delayed by one clock cycle
K=(C+D)/2, delayed by one clock cycle
L=(E+F)/2, delayed by one clock cycle
M=(G+H)/2; delayed by one clock cycle
Q=K−Z,
R=L−Z,
S=M−Z,
T=J−Z.

The intermediate quantity Y is the ones complement of P, delayed by one clock cycle to match the pipeline delays incurred in the calculation of the quantities J, K, L and M in the preferred high-speed embodiment. The quantity Z represents the twos complement of P. It is calculated in the embodiment of FIG. 5 by supplying a "1" to the carry input of adders 49–52, which has the effect of adding "1" to the quantity Y. The computation of these intermediate quantities is common to both the point and edge operators.

As seen in FIG. 5, the apparatus includes adders 43–46 for computing the intermediate quantities J, K, L, and M. These adders may be provided by one or more 74S283 integrated circuit adders, which have been cascaded as required to handle the number of bits of intensity value carried by each of the buses A–H. The division by 2 indicated in Equations 3 and 4 is performed by truncation of the least significant bit at each of the adders 43–46, as indicated at 47. The clock-cycle delays indicated in Equations 3 and 4 are produced by pipeline delay registers 48. The intermediate quantities T, Q, R, and S are computed by adders 49–52, which may also be provided by an appropriate number of cascaded 74S283 integrated circuit adders. The intermediate quantities J, K, L, and M are each communicated to one of the adders 49–52 along the correspondingly labeled bus. The intensity value of the center pixel P is inverted by inverter 53 and communicated to an input of each of the adders 49–52, along with a unity bit on bus 54.

At this point the edge and point computations differ. The adders 49–52 preserve the sign of the intermediate quantities T, Q, R, and S. The edge operator includes means 55–58 for taking the absolute value of these quantities. An appropriate absolute value module may readily be configured from available integrated circuit components. The absolute values are summed in accordance with Equation 4 by adders 60 and 61, which are cascaded with adder 62 to produce the edge measure EM. Each of the adders 60–62 also performs a division by 2 by truncating the least significant bit.

To compute the point measure PM, the signed intermediate values T, Q, R, and S are summed by adders 64 and 65 without taking the absolute value. These adders are cascaded with adder 66. The adders 64–66 perform the divisions by 2 indicated in Equation 3 by truncating the least significant. bit. The output from adder 66 is the point measure PM.

To calculate the point and edge measures PM and EM at high pixel rates, pipeline registers are used to simultaneously perform calculations on successive center pixels and their associated neighborhoods. The number of successive center pixels and neighborhoods which are simultaneously the subject of calculation depends on the number of levels of pipeline registers. As indicated above, FIG. 5 shows one level of pipeline registers 48 inserted after adders 43–46. In a preferred high-speed embodiment, additional pipeline registers are inserted before adders 64 and 65, after absolute-value means 55–58, and after adders 60–62 and 64–66.

Multiple levels of pipelining in this manner limit the accumulation of computational delays. In the embodiment illustrated in FIGS. 4–6 with a full complement of pipeline registers as just described, a real-time computational rate of 16 mega pixels/sec has been achieved.

The edge measure signal EM and the intensity value of the selected center pixel are applied to edge threshold module 71 (see FIG. 6). Edge threshold module 71 provides a binary edge signal (BE), which indicates whether the selected center pixel lies near an edge, that is, lies in a transition region. The edge measure EM is compared with an edge threshold ET by magnitude comparator 72, which provides the binary edge signal BE at its output. A suitable integrated circuit component for comparator 72 is provided by a 74LS682 8-bit magnitude comparator.

The edge threshold signal ET determines the size of a transition region. In a preferred embodiment the edge threshold ET will be made to depend upon the intensity value of the selected center pixel. To this end, edge threshold module 71 includes a means for defining an adjustable edge threshold, which comprises PROMs 73 and 74, multilevel pipeline registers 76 and 77, and D-type flip flop 78. The PROMs are utilized to perform a table lookup of the appropriate edge threshold. PROMs 73 and 74 may be provided by 74S472 integrated circuit components, which have a 75-nanosecond access time. To perform the table lookup with the access time of these components, the input data stream is split in two parallel paths, which are phased such that alternate pixels travel along separate paths. The pipeline delays for coordinating the two parallel pixel paths can readily be established by one of ordinary skill in the art For example, proper timing is provided by flip flops 81 and 82. Flip flop 81 provides control signals for alternately enabling registers 76 and 77. Flip flop 82 provides control signals to the OUTPUT ENABLE lead of PROMs 73 and 74 for alternately enabling these PROMs. Flip flops 81 and 82 may be provided by a 74S74 dual, edge-triggered D-type flip flop. Flip flops 81 and 82 and pipeline registers 76 and 77 receive a common clock signal. The edge threshold defined by the programs stored in PROMs 73 and 74 is shifted to register 83 for comparison with the edge measure by comparator 72.

The edge-threshold PROMs 73 and 74 may be programmed to generate an edge threshold signal ET which is any specified function of the center pixel intensity value P and a selectable configuration constant I: ET=f(P,I). Good results have been obtained with the following edge threshold equation:

$$ET = \begin{cases} aI/b \text{ for } 0 \leq P < a \\ IP/b \text{ for } a \leq P < 2^5 \end{cases} \qquad \text{(Eq. 5)}$$

In Equation 5, I is a four bit constant and P represents the five most significant bits of the center pixel intensity value. In FIG. 6 pipeline registers 76 and 77 receive the center pixel intensity value P from buffer 86 and store that value until called for by PROMs 73 and 74. Registers 76 and 77 truncate the three least significant bits of the center pixel intensity value, as indicated at 87 and 88, respectively. The constants a and b in Equation 5 may be chosen according to the intended application. Typical values are a=4 and b=8. The edge threshold defined by Equation 5 will be proportional to the center pixel intensity value for intensity values above a lower limit defined by the constant a. Below that lower limit the edge threshold is determined by the configuration constant I.

An alternative function for defining the edge threshold is as follows:

$$ET = \begin{cases} I & \text{for } (a + P^2/b) < 1 \\ I(a + P^2/b) & \text{for } (a + P^2/b) \geq 1 \end{cases} \quad \text{(Eq. 6)}$$

Equation 6 has been found to be advantageous if the edge information at darker levels is more important than the edge information at lighter levels. Typical values of the constants a and b are $a = \frac{1}{2}$ and $b = \frac{1}{2}^7$.

As another alternative, PROMs 73 and 74 may be programmed with a fixed predetermined edge threshold, independent of the center pixel intensity value.

The point operator module includes a means for assigning a bit value to the center pixel, which indicates whether the center pixel is to be black or white in the enhanced image. The means is illustrated at block 91 of FIG. 6. Block 91 includes adders 92 and 93 and register 94. Adders 92 and 93 form the sum of the point measure PM computed in FIG. 5 and a point offset value, which is stored in point offset register 94. The point measure PM as computed in FIG. 5 is a signed quantity. The bit value assigned to the center pixel by means 91 corresponds to the sign of the sum of the point measure and the point offset. The bit value assigned by means 91 is referred to as the point bit value or the point video signal (PV).

As illustrated in FIG. 6, adders 92 and 93 are provided by four-bit full adders with fast carry, such as integrated circuit part number 74S283, which are cascaded in four-bit increments. The point offset register 94 is provided by an octal D-type flip flop such as a 74L273. The four least significant bits of the point measure PM and of the point offset constant are summed by adder 93 and the four most significant bits of the point measure PM and of the point offset constant are then summed by adder 92. The point video signal is taken to be the output sign bit from adder 92.

The level operator module 16 illustrated in FIG. 6 includes means 101 for defining a level threshold and comparison means 102 for comparing the level threshold with the intensity value of the center pixel. Comparison means 102 provides a binary level video signal (LV) at its output, which indicates whether the center pixel intensity value is greater than or less than the level threshold. Comparison means 102 may be provided, for example, by a 74LS682 8-bit magnitude comparator.

Two types of level thresholds may be advantageously defined by the threshold means 101. The level threshold may be a fixed value or it may be a position-dependent value. A fixed level threshold would typically be used in connection with an original known to consist of only black and white images. Even in this case, however, it may also be advantageous to use an adaptive thresholding technique, for example, by setting the level threshold with respect to a representative intensity value of the array. The level threshold may be set in proportion to the average intensity of the pixels comprising the first few scan lines. These scan lines will generally be located at the border of a document being scanned and, thus, represent the general background coloration and brightness to be expected for that document. If the original being scanned includes shades of gray, and it is desired to preserve the appearance of gray in the enhanced image, then a level threshold dependant upon position in the array is desirable.

Level threshold means 101 includes PROMs 103 and 104, address counters 106, 107, and 108, and register 109. The PROMs 103 and 104 are utilized to perform a table lookup of the appropriate level threshold. The level threshold to be compared with any given center pixel is stored in register 111. As in the edge threshold means, the PROMs 103 and 104 may be provided by 74S472 integrated circuit components. Counter 106 is provided by a 74LS393 dual 4-bit binary ripple counter. Counter 106 counts scan line by scan line. Counters 107 and 108 count pixel by pixel. They are provided by 74S169 synchronous 4-bit up/down counters. As in the case of the edge threshold means, the level threshold means 101 includes two PROMs 103 and 104, each with a 75-nanosecond access time. The control signals to the PROMs are properly phased so that the overall system will have a 16-megaHertz maximum pixel rate. As shown in FIG. 6, each PROM 103 and 104 receives a 3-bit line count signal, a 3-bit pixel count signal, and a 3-bit configuration constant signal from register 109. The level threshold defined by the table lookup for the selected center pixel is stored in register 111 for comparison with the center pixel intensity value by comparator 102. The comparator 102 receives the center pixel intensity value from buffer 86 with the appropriate delay introduced by cascaded pipeline delay registers 112 and 113. The desired delay introduced by these registers depends upon the neighborhood size. Thus, the delay introduced by one or both of registers 112 and 113 is advantageously jumper-selectable. The registers 112 and 113 may be provided by an AM 29520 multi-level pipeline register, which includes control lines suitable for selecting a $3 \times 3$, $5 \times 5$, $7 \times 7$, or $9 \times 9$ neighborhood.

The binary point video signal PV, the binary level video signal LV, and the binary edge signal BE are applied to the logic means indicated at block 17 of FIG. 6. The logic means provides a binary video signal (BV) at its output, which indicates whether the center pixel is to be black or white in the enhanced image. The logic means includes AND gates 116 and 117, OR gate 118, and inverter 119. The arrangement of gates is such that when the binary edge signal BE is a logic 1, indicating that the center pixel lies within a transition region, the logic value of the point video signal PV is passed to the output of OR gate 118 to provide the binary video signal BV. When BE is a logic 0, the binary video signal at the output of OR gate 118 is equal to the logic value of LV.

An advantage of the present invention is the flexibility it provides in compensating for a poor quality original document or other imaged subject matter. The edge, point, and level modules may each be adjusted to "fine-tune" the quality of the enhanced image. First, the level threshold scheme stored in PROMs 103 and 104 may be adjusted. Such adjustment will have the primary effect of changing the "grayness" of large regions of gray. Second, the edge threshold stored in PROMs 73 and 74 may be adjusted. The edge threshold determines the sensitivity for picking up edges. Adjustment of the edge threshold can be used to eliminate speckles which may appear in the enhanced image of a light original. Third, the point offset value stored in register 94 can be adjusted. Such adjustment effects the fineness or boldness of lines appearing in the enhanced image.

While the above provides a full and complete disclosure of the preferred embodiments of the invention, various modifications, alternate constructions, and equivalents may be employed without departing from the true spirit and scope of the invention. For example, a preferred high-speed embodiment has been described employing hardware components to perform arithmetic and logical operations as called for by the invention. Those skilled in the art will appreciate, however, that for image-enhancement applications in which fast processing speed is not important, a microprocessor may be programmed to carry out the necessary arithmetic and logical operations. Therefore, the above description and illustrations should not be construed as limiting the scope of the invention, which is defined by the appended claims.

What is claimed is:

1. Apparatus for use in enhancing boundaries between light and dark regions of a video image depicting both continuously varying tones of gray or other color as well as two tone text or graphics or the like, said video image being represented by an array of pixels, each pixel of which has an intensity value associated therewith indicative of gray level or the like, a light and a dark region of said image being separated by a transition region wherein said image varies rapidly between light and dark, said apparatus comprising:

neighborhood-defining means receiving said array of pixels and, for pixels in regions depicting two tones as well as for pixels in regions depicting continuously varying tones, presenting a center pixel and a plurality of pixels forming a two-dimensional neighborhood of said center pixel;

edge operator means receiving said center pixel and said neighborhood and determining therefrom whether said center pixel lies in a transition region, said edge operator means providing an edge bit value indicative of the disposition of said center pixel with respect to said transition region;

point operator means for providing a binary representation of transition regions, said point operator means receiving said center pixel and said neighborhood and assigning a point bit value to said center pixel indicating whether said center pixel is dark or light based on the intensity values of said neighborhood;

level operator means for providing a binary representation of regions of continuously varying tones, said level operator means receiving said center pixel and assigning a level bit value thereto indicating whether said center pixel is dark or light based on the continuously varying tone level being represented; and logic means receiving said edge bit value, said point bit value, and said level bit value, said logic means passing said point bit value to an output thereof when said edge bit value indicates said center pixel lies in a transition region and passing said level bit value to said output otherwise.

2. The apparatus of claim 1, wherein said edge operator comprises:

means for computing a measure of the variation of intensity values within said neighborhood; and means for comparing said measure with an edge threshold, said edge bit value indicating whether said measure is greater than or less than said edge threshold.

3. The apparatus of claim 2, further comprising means receiving the intensity value of said center pixel and defining said edge threshold based on said center pixel intensity value.

4. The apparatus of claim 1, wherein said point operator means comprises:

means for computing an average intensity value of said neighborhood and for computing the difference between said average intensity value and said center pixel intensity value; and means for assigning said point bit value based on the computed difference.

5. The apparatus of claim 4, wherein said means for assigning said point bit value comprises:

a register for storing a point offset value; and means for forming the sum of said point offset value and said computed difference, wherein said point bit value corresponds to the sign of said sum.

6. The apparatus of claim 1, wherein said neighborhood-defining means includes neighborhood-select means for selecting one of a plurality of dispositions of pixels about said center pixel forming said two-dimensional neighborhood.

7. The apparatus of claim 1, wherein said level operator means comprises digital half-tone means for assigning said level bit value according to digital half-toning algorithm.

8. The apparatus of claim 1, wherein said neighborhood-defining means defines a two-dimensional neighborhood consisting of pixels bounding said center pixels.

9. The apparatus of claim I, wherein said neighborhood-defining means defines a two-dimensional neighborhood consisting of pixels about said center pixel which do not bound thereon.

10. Apparatus for use in enhancing boundaries between light and dark regions of a video image depicting both continuously varying tones of gray or other color as well as two tone text or graphics or the like, said video image being represented by an array of pixels, each pixel of which has an intensity value associated therewith indicative of gray level or the like, a light and a dark region of said image being separated by a transition region wherein said image varies rapidly between light and dark, said apparatus comprising:

neighborhood-defining means receiving said array of pixels, for pixels in regions depicting two tones as well as for pixels in regions depicting continuously varying tones, presenting a center pixel and a plurality of pixels forming a two-dimensional neighborhood of said center pixel;

edge operator means comprising: an array of arithmetic and logic elements responsive to the intensity values of said center pixel and said neighborhood pixels for computing a measure of the variation of intensity values within said neighborhood; means defining an edge threshold; and means for comparing said measure with said edge threshold, said edge operator means assigning an edge bit value to said center pixel indicating whether said measure is greater than or less than said edge threshold;

point operator means for providing a binary representation of transition regions, said point operator means comprising an array of arithmetic and logic elements responsive to the intensity values of said center pixel and said neighborhood pixels for computing an average intensity value of said neighborhood pixels and for computing the difference between said average intensity value and said center pixel intensity value, said point operator means assigning a point bit value to said center pixel based on the computed difference;

level operator means for providing a binary representation of regions of continuously varying tones, said level operator means comprising level threshold means defining a level threshold; and comparison means for comparing said center pixel intensity value with said level threshold, said level threshold means assigning a level bit value to said center pixel indicating whether said center pixel intensity value is greater than or less than said level threshold; and logic means receiving said edge bit value, said point bit value, and said level bit value, said logic means passing said point bit value to an output thereof when said edge bit value indicates said center pixel lies in a transition region and passing said level bit value to said output otherwise.

11. Apparatus for use with a video camera for processing in real time a video image captured by said camera and depicting both continuously varying tones of gray or other color as well as two tone text or graphics or the like to enhance the boundaries between the light and dark regions thereof, said video image being represented by an array of pixels, each pixel of which has an intensity value associated therewith indicative of gray level or the like, a light or a dark region of said image being separated by a transition region wherein said image varies rapidly between light and dark, said video camera providing a data stream in which said pixels are arranged in an array of image scan lines, said apparatus comprising:

buffer memory means responsive to said data stream to present simultaneously three scan lines captured by said video camera;

delay means receiving said three scan lines and selecting therefrom a center pixel and a plurality of pixels forming a two-dimensional neighborhood of said center pixel;

first logic means responsive to the intensity values of said center pixel and said neighborhood pixels for computing therefrom an average intensity value of said neighborhood pixels and a measure of the variation of said neighborhood pixel intensity values, said first logic means providing a point signal indicative of the difference between the center pixel intensity value and said average intensity value and providing an edge signal indicative of said measure;

adder means responsive to said point signal to form the sum of said difference and a predetermined offset value, said adder means providing a point bit value indicative of whether said sum is positive or negative;

first comparison means responsive to said edge signal to provide an edge bit value indicative of whether said measure is greater than or less than an edge threshold value;

level threshold means providing a level threshold selected from a plurality of thresholds representing the continuously varying tone levels;

second comparison means responsive to said center pixel intensity value and providing a level bit value indicative of whether said center pixel intensity value is greater than or less than the level threshold; and second logic means responsive to said point bit value, said edge bit value, and said level bit value to pass said point bit value to an output thereof when said edge bit value assumes a first logic value and to pass said level bit value to said output when said edge bit value assumes a second logic value.

* * * * *